United States Patent [19]

Gee et al.

[11] Patent Number: 4,743,815
[45] Date of Patent: May 10, 1988

[54] BRUSHLESS PERMANENT MAGNET MOTOR SYSTEM

[75] Inventors: David E. Gee; J. Stephen Thorn, both of Florissant, all of Mo. 63033

[73] Assignee: Emerson Electric Co., St. Louis, Mo.

[21] Appl. No.: 91,759

[22] Filed: Sep. 1, 1987

[51] Int. Cl.$^4$ .............................................. H02P 6/02
[52] U.S. Cl. ..................................... 318/254; 318/138
[58] Field of Search ........................ 318/138, 254, 439

[56] References Cited

U.S. PATENT DOCUMENTS 4,250,435  2/1981  Alley et al. ..................... 318/254 X

FOREIGN PATENT DOCUMENTS 56-6693    1/1981  Japan ................................... 318/254
56-46680   4/1981  Japan ................................... 318/254
57-180382  11/1982 Japan ................................... 318/254

*Primary Examiner*—Bentsu Ro
*Attorney, Agent, or Firm*—Polster, Polster and Lucchesi

[57] ABSTRACT

A control system for a multi-phase brushless permanent magnet motor has circuitry for periodically generating signals representing the relative position of the rotor with respect to the stator, circuitry for decoding the periodically generated signals to determine the presence of the rotor at one of a plurality of predetermined rotary positions with respect to the stator, and circuitry for generating an interrupt signal in response to the presence of the rotor at one of the plurality of predetermined rotary positions with respect to the stator. Electrically controllable switches are connected to the phase windings to control the flow of current therethrough. A microprocessor is responsive to the interrupt signal for controlling in a closed loop manner the switches to commutate the phase windings of the motor a predetermined time after receipt of the interrupt signal. The microprocessor is also responsive to the speed of the motor to start the motor in a open loop mode and to shift commutation to the closed loop mode once the motor reaches a predetermined speed.

37 Claims, 5 Drawing Sheets

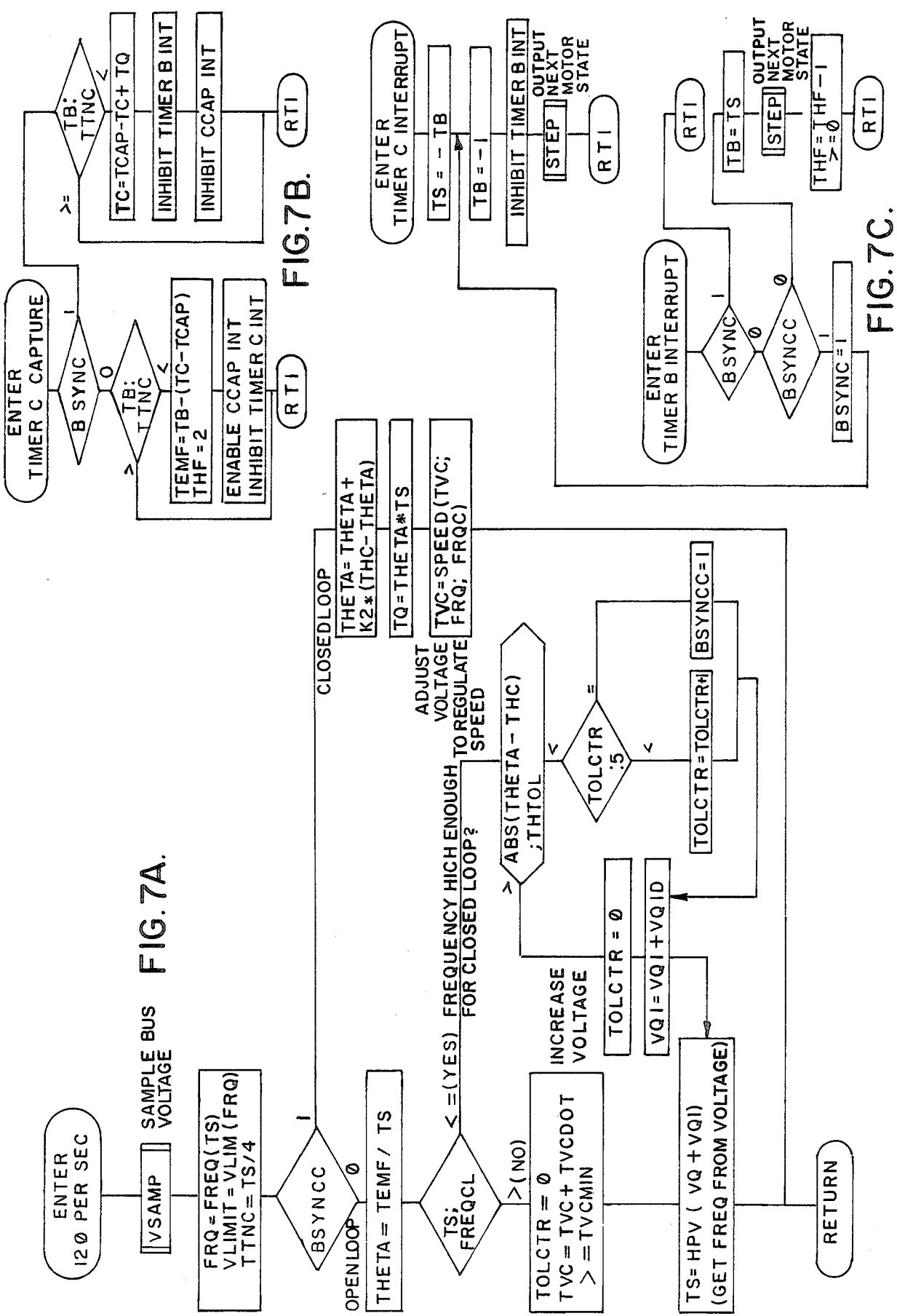

BRUSHLESS PERMANENT MAGNET MOTOR SYSTEM

BACKGROUND OF THE INVENTION

This invention relates generally to the field of permanent magnet motors and more particularly to such motors which sense rotor position using back EMF.

According to Faraday's law when a time-varying magnetic flux "phi" interacts with a coil of wire having "N" turns, an electromotive force (EMF or voltage) is produced which is equal to the time rate of change of the magnetic flux times the number of turns. The polarity of this induced voltage tends to oppose current flow in an energized motor winding: hence the term "back" EMF.

In a permanent magnet motor, the source of the magnetic flux "phi" is a set of permanent magnets mounted on the rotor of the motor. The faster the motor turns, the faster the magnetic field changes relative to the stator windings of the motor, thus creating a larger back EMF. This back EMF can be used to provide position information of the rotor with respect to the stator in order to allow brushless commutation of the permanent magnet motor.

Numerous systems in the past have used back EMF commutation techniques. Early such systems were primarily unipolar and linked the back EMF directly or semi-directly to the switching devices so that commutation of the various phases of the motor was a direct result of the back EMF measured for the various phases. More complex systems have subsequently been designed, with a correspondingly high parts count. Still other systems have used passive filters to determine the commutation point after a zero crossing of the back EMF is sensed. These latter systems do have the advantage of being simple and requiring low-cost hardware, but their advance angle is not adjustable, but rather varies inherently with speed.

In addition to the back EMF systems outlined above, other brushless commutation systems have used Hall or optical sensors for position feedback. Such sensors, however, add hardware cost and occassionally suffer from reliability problems due to the harsh environment in which the sensors must often operate.

SUMMARY OF THE INVENTION

Among the various objects and features of the present invention may be noted the provision of a brushless permanent magnet motor which reduces the amount of external hardware required to provide commutation information.

Another object to the present invention is to allow optimum microprocessor control of commutation for a brushless permanent magnet motor based on back EMF conditioned voltages.

A third object of the present invention is the provision of a system with flexibility to select by software the best commutation point for a given motor application.

A fourth object to the present invention is the provision of such a system which eliminates Hall or optical sensors for position feedback.

A fifth object of the present invention is the provision of such a system which uses the back EMF from an open phase as one item of information in determining the correct commutation point for a particular motor application.

A sixth object of the present invention is the provision of such a system which allows the advance angle to be adjusted depending upon the desired speed and load.

A seventh object of the present invention is the provision of such a system which allows the brushless permanent magnet motor to start in open loop mode and then shift to a closed-loop mode.

An eighth object of the present invention is the provision of such a system which is useable with both back EMF and Hall sensors as desired.

Other objects and features will be in part apparent and in part be pointed out hereinafter.

In a first embodiment, a control system of the present invention is adapted for a multi-phase brushless permanent magnet motor having a stator with at least one phase winding per phase of the motor, a rotor mounted for rotation in the stator, said rotor carrying a plurality of permanent magnets so that rotation of the rotor with respect to the stator generates a back EMF in the phase windings of the stator, and motor terminals for each phase adapted to be connected to a power source. The control system includes circuitry for periodically generating signals representing the relative position of the rotor with respect to the stator, and circuitry for decoding the periodically generated signals to determine the presence of the rotor at one of a plurality of predetermined rotary positions with respect to the stator. The decoding circuitry includes means for generating an interrupt signal in response to the presence of the rotor at one of the plurality of predetermined rotary positions with respect to the stator. Electrically controllable switches are connected to the phase windings to control the flow of current therethrough. And a microprocessor is responsive to the interrupt signal for controlling the switches in a closed loop manner to commutate the phase windings of the motor a predetermined time after receipt of the interrupt signal. The microprocessor is also responsive to the speed of the motor to start the motor in a open loop mode and to shift commutation to the closed loop mode once the motor reaches a predetermined speed.

In a second embodiment, a control system of the present invention includes circuitry connected to the motor terminals for sensing the back EMF of each phase and in response thereto periodically generating signals representing the relative position of the rotor with respect to the stator. It also includes circuitry for decoding the periodically generated signals to determine the presence of the rotor at one of a plurality of predetermined rotary positions with respect to the stator. The decoding circuitry generates an interrupt signal in response to the presence of the rotor at one of the plurality of predetermined rotary positions with respect to the stator. Electrically controllable switches are connected to the phase windings to control the flow of current therethrough. A microprocessor is responsive to the interrupt signal for controlling the switches in a closed loop manner to commutate the phase windings of the motor a predetermined time after receipt of the interrupt signal. The microprocessor is also responsive to the speed of the motor to start the motor in a open loop mode and to shift commutation to the closed loop mode once the motor reaches a predetermined speed.

A method of the present invention for controlling a multi-phase brushless permanent magnet motor having a stator with at least one phase winding per phase of the motor, a rotor mounted for rotation in the stator, said rotor carrying a plurality of permanent magnets so that rotation of the rotor with respect to the stator generates a back EMF in the phase windings of the stator, motor terminals for each phase, and electrically controllable switch means connected between a power source and the phase windings to control the flow of current therethrough, includes the steps of sensing the back EMF of each phase and in response thereto periodically generating signals representing the relative position of the rotor with respect to the stator. The periodically generated signals are decoded to determine the presence of the rotor at one of a plurality of predetermined rotary positions with respect to the stator. An interrupt signal is generated in response to the presence of the rotor at one of the plurality of predetermined rotary positions with respect to the stator. The motor is started in a open loop mode. Once a predetermined motor speed has been reached, there is a shift from a open loop mode to a closed loop mode of operation. The switch means are controlled in a closed loop to commutate the phase windings of the motor a predetermined time after receipt of the interrupt signal once the predetermined motor speed has been reached.

BRIEF DESCRIPTION OF THE DRAWINGS

FIGS. 7A through 7C is a flow chart for the software used in the system of FIG. 3.

Similar reference characters indicate similar parts throughout the several views of the drawings.

DESCRIPTION OF THE PREFERRED EMBODIMENTS

Figure 1:
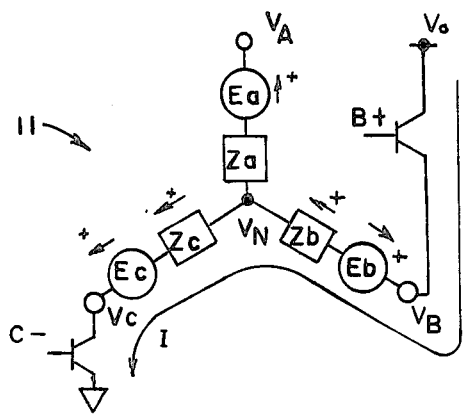
FIG. 1 is an electrical schematic of a three phase brushless permanent magnet motor illustrating the various voltages occurring when the A-phase is the open phase.

A brushless permanent magnet motor 11 (FIG. 1) includes three phases A, B, and C represented in FIG. 1 by their respective impedances Za, Zb, and Zc. Motor 11 is shown with the supply voltage Vo supplied by means of a pair of transistors B+ and C− across the B and C phases of motor 11 so that current I flows through those phases. This leaves the A-phase open. As shown in FIG. 1, each phase has a back EMF Ea, Eb, and Ec, associated therewith due to the rotation of the permanent magnet rotor (not shown) of motor 11. The terminal voltage for each phase is labeled VA, VB, and VC, respectively.

Figure 2:
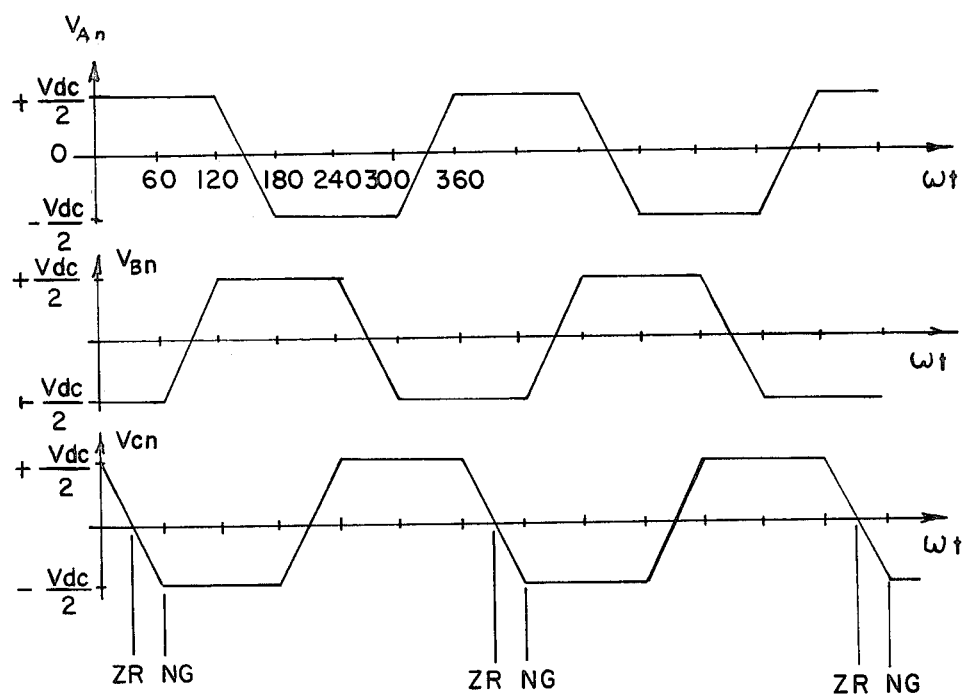
FIG. 2 is a graphical representation of the ideal back EMF voltages in the three phase motor of FIG. 1 based on 120 degrees of conduction for each phase.

Assuming that the back EMF is symmetrical and that the winding impedances of the three phases are matched, it can be shown, as is well known, that absent a back EMF in the A-phase the voltage VA would equal the voltage VN at the neutral point independently of load current. Subtracting the voltage VN from the A-phase terminal voltage VA thus gives a voltage which is the back EMF for that phase. That is, by referencing voltage VA to the neutral voltage, present on a neutral wire, one obtains the back EMF graph shown in the topmost line of FIG. 2. Similar considerations result in the plots of the second and third lines for the B-phase back EMF voltage VBN referenced to the neutral and the C-phase back EMF voltage VCN referenced to neutral. This ideal back EMF plot of FIG. 2 shows the trapezoidal back EMF for each phase and reflects the fact that the various phases are commutated on every 120 electrical degrees.

It should be noted that the back EMF for each phase with respect to the neutral wire crosses zero roughly 30 degrees before that particular phase first reaches its most negative back EMF excursion. For clarity these zero crossing points (labeled ZR) and the most negative excursion points (labeled NG) are shown for the C-phase only although the graph clearly shows such points for the A and B phases as well. To optimize the torque output of motor 11, the phase having the negative going zero crossing as shown in FIG. 2 should be commutated between that zero crossing point ZR and the point NG. Of course the exact commutation point could be varied depending upon the load current and the speed for any particular motor application.

Figure 3:
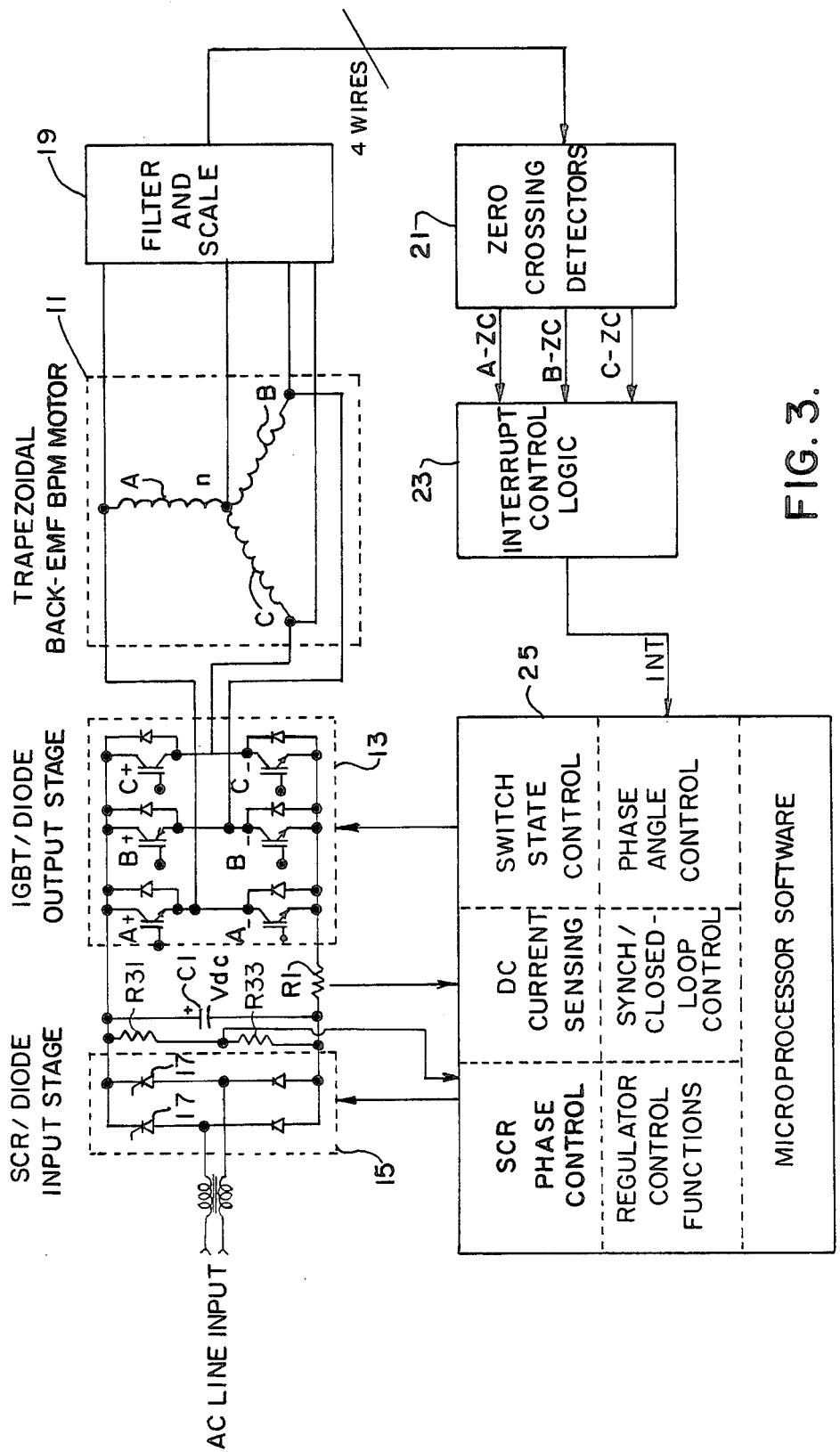
FIG. 3 is a block diagrammatic representation of one embodiment of the brushless permanent magnet motor system of the present invention.

In the embodiment of FIG. 3, motor 11 has its terminals connected to a dc power source through an inverter output stage 13. The dc power source in this embodiment is an SCR/diode input stage 15 connected to a suitable ac line input. As is known in the art, by controlling the phase at which a pair of SCRs 17 are turned on, the ac voltage from the ac line can be converted to a dc voltage on a capacitor C1. This dc voltage is applied to the desired pairs of phase windings A through C by means of six switching circuits A+, B+, C+, A−, B−, and C− in the conventional manner. Each switching device A+ through C− consists of an IGBT transistor in parallel with a diode, although similar switching devices could be used. When switching device A+ and switching device B− are both "on", current from the dc supply flows through the switching device A+, through winding A, then winding B, and finally through switching device B− back to the negative side of the dc source. The other switching devices operate in the same manner to commutate motor 11. In returning to the negative side of the dc source, the motor current flows through a current sensing resistor R1 so that the system of FIG. 3 may change the commutation as a function of motor current if desired.

The motor terminals of motor 11 are also connected through a filter and scale circuit 19 whose only purpose is to lower the measured voltages on the terminals to a level compatible with the electronic components used in the remainder of the system of FIG. 3. Note that the neutral point N of motor 11 is also connected by a neutral wire to filter and scale circuit 19. Once the signal from the motor terminals have been filtered and scaled by circuit 19, the filtered and scaled signals are supplied to zero crossing detectors 21. These zero crossing detectors detect the zero crossing point ZR for each of the three phases. Signals from the zero crossing detectors are then supplied to interrupt control logic 23, which analyzes the signals to determine when the desired zero crossings have occurred. Once a desired zero crossing has occurred, the interrupt control logic 23 sends an interrupt signal to a microcomputer or microprocessor 25. Microprocessor 25 is responsible for responding to the interrupt signal to commutate the switching devices of output stage 13 at the proper time to commutate motor 11. In so doing, it controls the phase angle of the commutation.

Microprocessor 25 is also responsible for controlling the phases of SCRs 17 to provide the proper dc voltage. In addition it senses the dc current through resistor R1. It also switches between open loop operation of motor 11 during starting to closed-loop control of the motor during operation.

Although the system of FIG. 3 is shown using SCR phase control, it should be realized that various fixed voltage and pulse width modulated front end voltage sources could be used instead. Moreover, even though the system is shown as using back EMF position sensors, such a system could use Hall position sensors as well. This particular system does provide a great deal of flexibility for different motor applications, since the actual commutation point is controlled in software and can take into account motor current, motor speed, and other relevant parameters.

Figure 4:
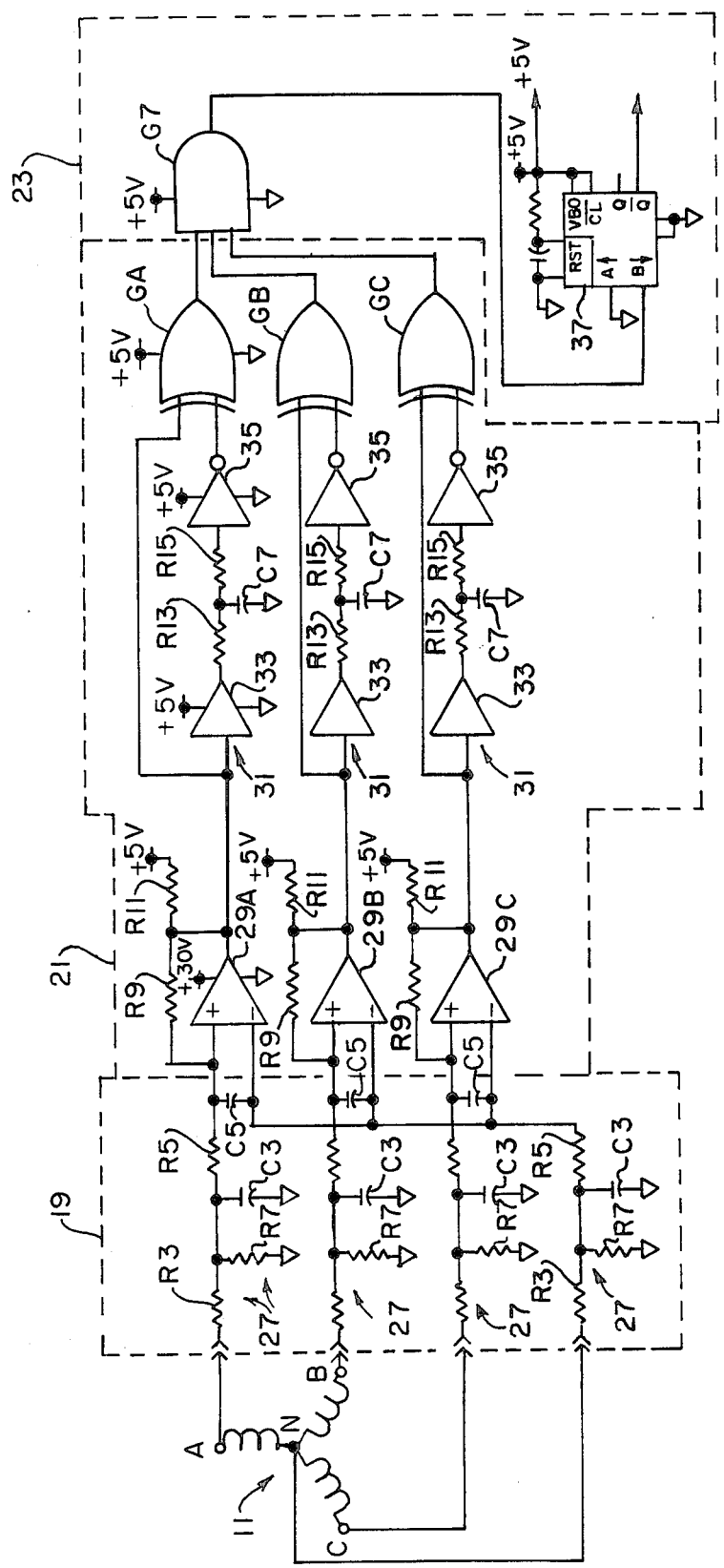
FIG. 4 is an electrical schematic of back EMF position detection circuitry of the system of FIG. 3.

The filter and scale circuitry 19, zero crossing detectors 21, and interrupt control logic 23 are illustrated in more detail in FIG. 4. Turning first to filter and scale circuitry 19, for each phase A through C of motor 11, there is a corresponding resistor/capacitor network 27 for suitably scaling and filtering the terminal voltages from the motor. Note that the neutral wire N also has such a circuit 27. These circuits are made up of a first resistor R3 in series with a second resistor R5 between their respective motor terminals and the noninverting input of one of a set of three comparators 29A, 29B, and 29C. In the case of the circuit associated with a neutral wire, the resistors R3 and R5 are connected in series between the corresponding motor terminal and the inverting input of all thre comparators 29A through 29C. A third resistor R7 and a capacitor C3 are connected between the junction of resistors R3 and R5 and ground. This filter and scale circuitry 19 is needed because the voltage applied to the terminals of motor 11 can be 280 volts dc, for example, which is excessively high for economical semiconductor components such as comparators 29A through 29C. The filter and scale circuitry 19 also includes a second capacitor C5 connected across the inverting and noninverting inputs of each comparator 29A through 29C.

Each comparator 29A through 29C has associated therewith a pair of resistors R9 and R11 connected in series between a +5 volt source and the noninverting terminal of the comparator. The junction between resistors R9 and R11 is also directly connected to the output of its respective comparator. The output of each comparator 29A through 29C is a signal representative of the voltage on its asssociated terminal referenced to the voltage on the neutral wire. This signal will ideally be a square wave having transitions at the zero crossings shown in FIG. 2. The associated signal is supplied both directly to a corresponding exclusive OR gate (gate GA, GB, or GC, for the A—, B— and C— phases respectively) and indirectly to the other input of that gate through a circuit 31.

For each phase, circuit 31 includes a hex buffer 33 whose input is the output of its corresponding comparator 29A through 29C, and whose output is supplied through a series pair of resistors R13 and R15 to the input of a Schmitt trigger 35. The junction between resistors R13 and R15 is also connected via a capacitor C7 to ground. Schmitt trigger 35 has built in hysteresis for signal shaping purposes. Schmitt trigger 35 inverts its input so that output of the Schmitt trigger is of opposite polarity to the input of circuit 31 so long as the polarity of the output of the corresponding comparator 29 remains unchanged.

The output of each Schmitt trigger 35 is supplied to the second input of its exclusive OR gate GA through GC respectively. So long as the output of its comparator 29 remains of the same polarity, the two inputs to the exclusive OR gate corresponding thereto remain different and the output of exclusive OR gate remains High. However, once the polarity changes, i.e., at a zero crossing, the topmost input to the exclusive OR gate changes immediately while the output of Schmitt trigger 35 takes some time to change. As a result, for that particular circuit 31 the two inputs to its exclusive OR gate are temporarily the same, so the output of that exclusive OR gate goes Low temporarily.

The outputs of each exclusive OR gate, therefore, represent the zero crossing of its associated back EMF signal. These three signals are supplied from exclusive OR gates GA through GC to three inputs of an AND gate G7 which makes up part of interrupt control logic 23. The output of gate G7 remains High at all times except when a zero crossing has been detected by any one of the exclusive OR gates. At that time the output of AND gate G7 goes Low momentarily. This Low is supplied to the set input of a monostable multivibrator 37 which also makes up part of interrupt control logic 23. The Q-bar output of monostable multivibrator 37 provides the interrupt input to microprocessor 25. Multivibrator 37 could be eliminated if sufficient delay is built into circuit 31 to provide a wide enough pulse for microprocessor 25.

Figure 5:
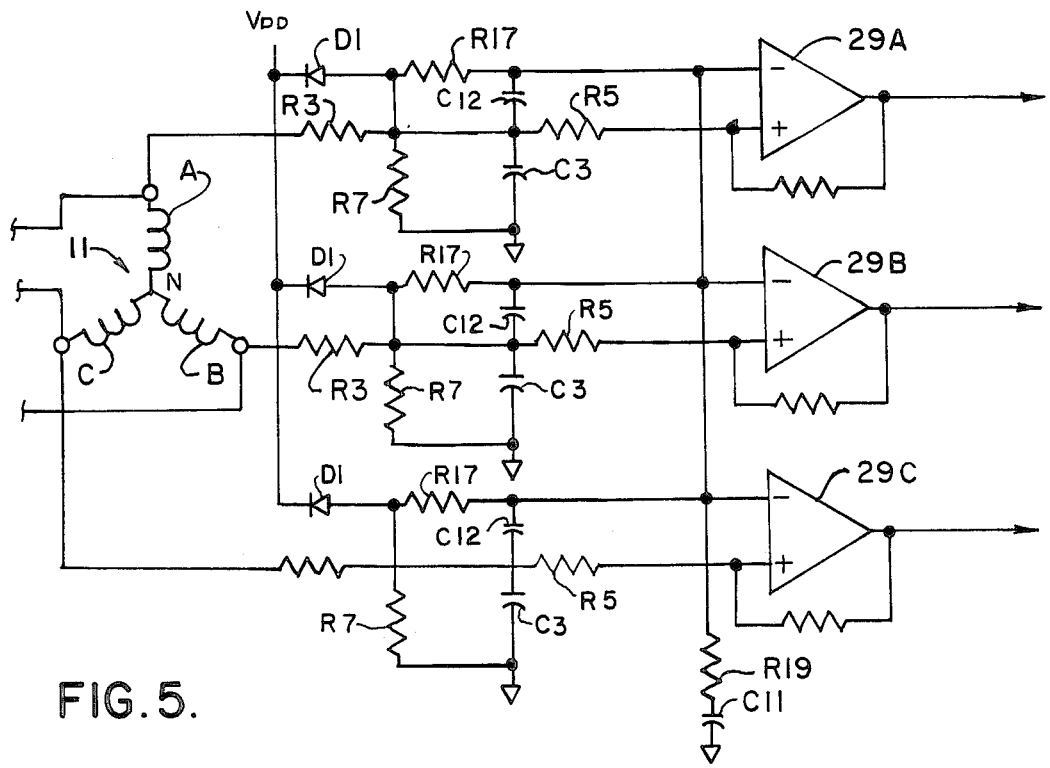
FIG. 5 is an electrical schematic of a system similar to that of FIG. 4 which includes a simulated neutral.

An alternative embodiment to a portion of the circuitry shown in FIG. 4 is illustrated in FIG. 5. In this embodiment, the neutral wire is not brought out of the motor, but rather the neutral voltage is simulated. In the embodiment of FIG. 5, comparators 29 each have their inverting input connected not to the neutral ground wire but to a synthesized voltage on a capacitor C11 representing the voltage on the neutral wire. There are also a set of three capacitors C12 connected between the inverting junction of their corresponding comparators 29 and the junction between resistors R3 and R5 of its corresponding filter and scale circuit 19. In addition a resistor R17 is connected in parallel with capacitor C12. The resistors R17 of each circuit are also connected through a diode D1 to a voltage source VDD. Diodes D1 are provided for protective purposes.

The inverting inputs of all three comparators are connected together and are connected through a series resistor R19 and capacitor C11 to ground. With this connection, the voltage on capacitor C11 is a function of the terminal voltages from all three terminals of motor 11, and represents the voltage present at the neutral connection of the motor. With this simulated neutral the outputs of comparators 29A through 29C, as in the embodiment of FIG. 4, are a square wave representing the zero crossings of their respective back EMFs referenced to neutral.

Figure 6:
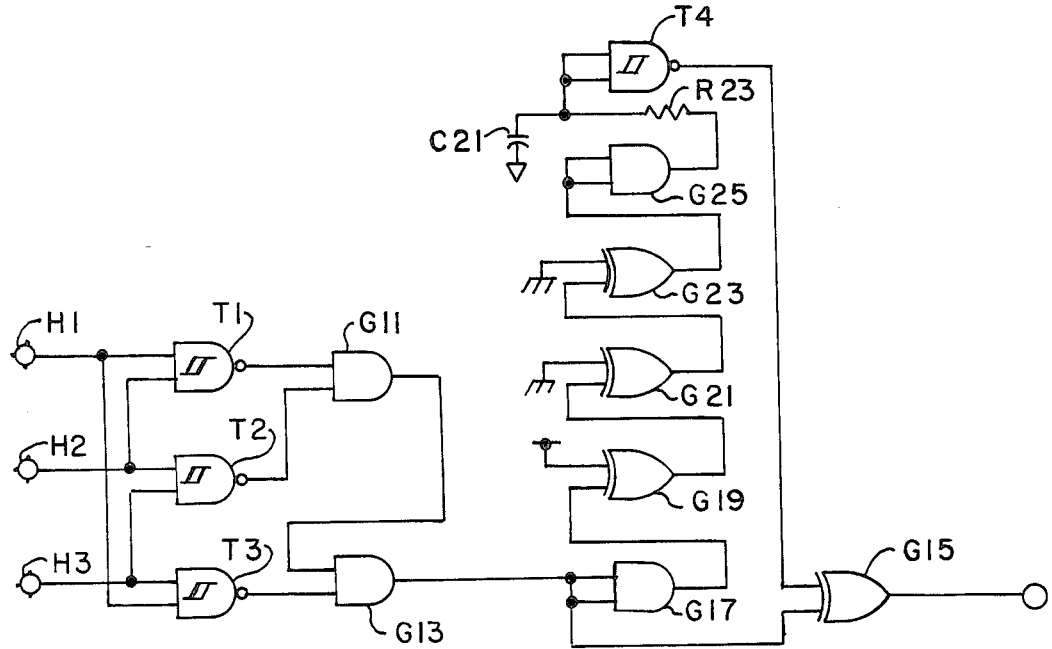
FIG. 6 is an electrical schematic illustrating the use of Hall sensors in connection with the system of FIG. 3.

Although the present invention has heretofore been described in connection with back EMF position sensing, it is not so limited. In FIG. 6, Hall position sensors H1, H2, and H3 are shown for providing position sensing information. The outputs of Hall sensors H1 through H3 are supplied to the inputs of a set of three NAND Schmitt triggers T1, T2, and T3. More particularly, the outputs of Hall sensors H1 and H2 are supplied to Schmitt trigger T1, the outputs of Hall sensors H2 and H3 are supplied to NAND Schmitt trigger T2, and the outputs of Hall sensors H1 and H3 are supplied to NAND Schmitt trigger T3. The outputs of NAND Schmitt triggers T1 and T2 are supplied to an AND gate G11 and the output of NAND Schmitt trigger T3 is supplied to one input of an AND gate G13. The other input to gate G13 is the output of gate G11 so that the output of gate G13 is a series of pulses representing the position information from Hall sensors H1 through H3.

The output of gate G13 is supplied directly to one input of an exclusive OR gate G15 and is also inverted by an AND gate G17. The output of gate G17 is supplied through a delay line made up of three exclusive OR gates G19, G21, and G23, an AND gate G25 configured as an inverter, and a NAND Schmitt trigger T4 to the other input of exclusive OR gate G15. The other input of gate G19 is connected to a +5 V source. The other inputs to exclusive OR gates G21 and G23 on the other hand are connected to ground. The output of inverter G25 is connected through a resistor R23 to the input of NAND Schmitt trigger T4. A capacitor C21 is also connected between ground and the junction of resistor R23 and the input to NAND Schmitt trigger T4. Gates G19 through G25 could be eliminated from the delay string if the values of resistor R23 and capacitor C21 were chosen large enough to give the desired time delay. The output of gate G15 is an interrupt signal which may be used instead of the interrupt signal described above in connection with FIG. 4 for supplying zero crossing information to microprocessor 25.

Of course, instead of Hall sensors H1 through H3, the outputs of comparators 29A through 29C of FIG. 4 could be connected directly to the inputs of gates T1 through T3 to eliminate the remaining circuitry of FIG. 4.

Microprocessor 25 is under software control. The relevant portions of this software are illustrated in FIG. 7. The microprocessor includes a group of timers labeled timer A, timer B, and timer C, which are internal to the microprocessor. The microprocessor also includes a register for storing the contents of timer C upon command.

Timer A controls the SCR firing, which is conventional, and is therefore not shown in FIG. 7. Timer B measures the interval between commutation steps for motor 11. Timer C initiates the commutation and has its value captured into the capture register whenever the interrupt signal is received from interrupt control logic 23.

In more detail, turning to FIG. 7A, the microprocessor enters the subroutine shown in FIG. 7A 120 times per second. Its first step in this subroutine is to sample the bus voltage as indicated by the label VSAMP. This is accomplished by sampling the voltage at the junction of a voltage divider made up of a pair of resistors R31 and R33 connected across capacitor C1.

Next the microprocessor computes the frequency of motor 11 from the time per step calculated by the timer B and stores this result in a variable labeled FRQ. It also from the frequency derives a voltage limit VLIMIT and computes a time TTNC which is equal to one fourth of the time per step TS. This time TTNC signifies a time too near to commutation.

The microprocessor next examines a variable BSYNCC to determine if the motor is commanded to be in the closed loop or open loop mode. If the motor is commanded to be in the closed loop mode, the microprocessor computes a new value THETA which is the phase angle between the back EMF pulse and commutation. This new value of THETA equals the previous phase angle THETA, plus a constant times the quantity THC (which is a commanded phase angle from a potentiometer) minus the previous value of THETA. It then computes the time, TQ, from the back EMF pulse to the motor step by multiplying the new value of THETA by the time per step, TS.

The voltage is then adjusted (by controlling SCRs 17) to regulate the speed of the motor to the desired level. This is done by computing a variable TVC which is the time after the zero crossing of the a.c. power line for the SCR firing. This variable is a function of its previous value, the actual frequency, and the desired or commanded frequency FRQC. In the closed loop mode, the microprocessor then returns from this subroutine of FIG. 7A.

In the open loop mode in the routine of FIG. 7A, after examining flag BSYNCC, the microprocessor computes THETA as the time between the back EMF pulse and commutation (represented by the variable TEMF) divided by the time per step TS. Variable TS is then compared with a preset time FREQCL representative of a desired frequency. If the frequency is high enough for closed loop operation, microprocessor 25 branches to the right (as shown on FIG. 7A) and examines the absolute value of THETA minus the commanded phase angle THC from the pot. This absolute value is compared with a preset value THTOL. If the absolute value is less than the preset value, a counter TOLTCR, which represents whether the phase angle is in tolerance, is compared with the number five. If this counter equals five the flag BSYNCC is set equal to one so that the next time the subroutine of FIG. 7A is entered, the program follows the closed loop mode branch of the program. On the other hand, if TOLTCR is less than five, the counter is incremented by one. In either case, the microprocessor 25 next updates a variable VQ1 which is added to VQ, the bus voltage measured at the junction between resistors R31 and R33, to find the correct volts per hertz. Variable VQ1 is updated by adding to its previous value a constant VQ1D which is the VQ1 slew rate. Once variable VQ1 is updated, time per step TS is set equal to a function of VQ and VQ1 from a look-up table to obtain the frequency from the voltage. After loading this value of time per step, microprocessor returns from the subroutine of FIG. 7A.

If, on the other hand, the frequency was not high enough for closed loop operation when TS was compared with FREQCL, microprocessor 25 sets the phase angle in-tolerance counter TOLTCR equal to zero, and updates the variable TVC (which represents the time after zero crossing for SCR firing), by adding to its previous value an SCR firing delay increment TVCDOT. In any event the value of TVC must be greater than a minimum SCR delay TVCMIN. Thereafter TS is computed as described above in connection with the case where the frequency is high enough for closed loop operation, and microprocessor 25 returns from the subroutine.

When the interrupt signal is received from interrupt control logic 23, microprocessor 25 enters the program represented by the flow chart of FIG. 7B. In this subroutine, the microprocessor first checks the flag BSYNC to detemine if the motor is in closed loop or open loop mode. If the motor is in the closed loop mode, microprocessor 25 takes the branch to the right.

In that branch the first step is a comparison of the contents of timer B with variable TTNC (which as described above indicates a time too near to commutation). If the contents of timer B is greater than or equal to TTNC, microprocessor 25 returns from this subroutine. On the other hand, if the constant TTNC is greater than the contents of timer B, the microprocessor replaces the value of variable TC with the sum of a variable TCAP (representing the value of timer C at the interrupt from interrupt control logic 23) and a variable TQ (representing the time from the back EMF pulse to the motor step), minus the previous value of TC. The microprocessor then inhibits both the timer B interrupt (discussed below) and the timer C capture interrupt (labeled CCAP INT) and then returns from the subroutine.

If, on the other hand, the motor is in the open loop mode, the microprocessor compares the contents of timer B with the variable TTNC. If the contents of the timer are greater than TTNC, it returns from the subroutine immediately. If the contents of the timer are less than TTNC, however, the microprocessor sets a variable TEMF which represents the time between the back EMF pulse and commutation. More specifically, this variable is set equal to the contents of timer B minus the quantity consisting of variable TC minus variable TCAP. The microprocessor also at this time sets a flag THF equal to two to indicate that the angle THETA is valid. The CCAP interrupt is then enabled and the timer C interrupt is then inhibited before the microprocessor 25 returns from the subroutine.

The flow chart of FIG. 7C has two entry points. The first is upon the occurrence of the timer C interrupt, i.e., when timer C counts to zero. When this occurs the time per step, TS, is set equal to the negative of the contents of timer B, timer B is set equal to minus one, the timer B interrupt is inhibited, and the microprocessor outputs the next motor state to switching devices 13 (i.e., commutates the motor) before returning from the interrupt.

In the second entry point to the flow chart of FIG. 7C, timer B has timed out. If this occurs when the motor is in the closed loop mode, microprocessor 25 simply returns from the subroutine. On the other hand, if the motor is in the open loop mode but the flag BSYNCC has been set to one in the program of FIG. 7A, the microprocessor thereupon sets a flag BSYNC equal to one as well so that the motor is now in the closed loop mode and the program returns to that sequence previously described with the timer C interrupt. In this portion of the program the contents of timer B are set to minus one, the timer B interrupt is inhibited, and the microprocessor outputs the next motor state before returning to the subroutine. On the other hand, if the motor is in the open loop mode and the flag BSYNCC is still set equal to zero, the timer B interrupt sequence causes microprocessor 25 to set timer B equal to TS, the time per state, before the microprocessor commutates the motor (that is, it outputs the next motor state to switching devices 13). Thereafter the microprocessor decrements the variable THF by one (assuming that this does not result in a negative value for THF) and then returns from the subroutine.

In view of the above, it will be seen that the various objects and features of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. A control system for a multi-phase brushless permanent magnet motor having a stator with at least one phase winding per phase of the motor, a rotor mounted for rotation in the stator, said rotor having a plurality of permanent magnet poles so that rotation of the rotor with respect to the stator generates a back EMF in the phase windings of the stator, and motor terminals for each phase adapted to be connected to a power source, comprising:
   means for periodically generating signals representing the relative position of the rotor with respect to the stator;
   means for decoding the periodically generated signals to determine the presence of the rotor at one of a plurality of predetermined rotary positions with respect to the stator;
   said decoding means including means for generating an interrupt signal in response to the presence of the rotor at one of the plurality of predetermined rotary positions with respect to the stator;
   electrically controllable switch means connected to the phase windings to control the flow of current therethrough;
   microprocessor control means responsive to the interrupt signal for controlling in a closed loop manner the switch means to commutate the phase windings of the motor a predetermined time after receipt of the interrupt signal, said microprocessor control means also being responsive to the speed of the motor to start the motor in an open loop mode and to shift commutation to the closed loop mode once the motor reaches a predetermined speed.

2. The control system for a multi-phase brushless permanent magnet motor as set forth in claim 1 wherein the power source includes an electrically controllable converter for converting alternating current power to a source to direct current power, for application of said direct current power to the switch means and the phase windings, wherein the microprocessor control means is responsive to the motor speed to control the voltage applied by the electrically controllable converter to the phase windings.

3. The control system for a multi-phase brushless permanent magnet motor as set forth in claim 1 wherein the means for periodically generating signals representing the relative position of the rotor with respect to the stator includes means connected to the motor terminals for sensing the back EMF of each phase winding and means for detecting when the back EMF for each phase winding referenced to motor neutral crosses zero.

4. The control system for a multi-phase brushless permanent magnet motor as set forth in claim 3 wherein the back EMF sensing means includes means for scaling and filtering the back EMF of each phase winding to a level compatible with the components of the zero crossing detecting means.

5. The control system for a multi-phase brushless permanent magnet motor as set forth in claim 3 wherein the zero crossing detecting means includes a comparator for each phase winding, said comparator having one input connected through a scaling circuit to its associated motor terminal so that the voltage on said one input is the back EMF from that motor terminal, said comparator for each phase winding also having its other input connected to a circuit whose output is representative of the neutral voltage of the motor, so that the output of the comparator for each phase represents the back EMF of that phase winding referenced to motor neutral.

6. The control system for a multi-phase brushless permanent magnet motor as set forth in claim 5 wherein the motor includes a neutral conductor terminal, and wherein the zero crossing detecting means includes means for scaling the signal from the neutral conductor terminal by the same amount as the scaling circuit for the other motor terminals scale the back EMFs for those terminals.

7. The control system for a multi-phase brushless permanent magnet motor as set forth in claim 5 wherein the zero crossing detecting means includes means for simulating the motor neutral.

8. The control system for a multi-phase brushless permanent magnet motor as set forth in claim 5 wherein the zero crossing detecting means includes at least one logic gate for each phase winding of the motor, one output of the comparator for that phase winding being directly connected to one input of the logic gate, further including a delay line between the output of the comparator and the other input of the logic gate, so that the output of the logic gate generates a signal when the back EMF of its associated phase winding referenced to motor neutral goes through zero.

9. The control system for a multi-phase brushless permanent magnet motor as set forth in claim 8 wherein the interrupt signal generating means includes a logic gate having as inputs the outputs of the logic gates for all the phase windings.

10. The control system for a multi-phase brushless permanent magnet motor as set forth in claim 1 wherein the means for periodically generating signals representing the relative position of the rotor with respect to the stator includes means connected to the motor terminals for sensing the back EMF of at least one phase winding and means for detecting when said back EMF referenced to motor neutral crosses zero.

11. The control system for a multi-phase brushless permanent magnet motor as set forth in claim 1 wherein the means for periodically generating signals representing the relative position of the rotor with respect to the stator includes at least one Hall-effect sensor per phase.

12. The control system for a multi-phase brushless permanent magnet motor as set forth in claim 11 further including logic gate means responsive to the Hall-effect sensors for generating a series of pulses representative of the rotary position of the rotor with respect to the stator, said interrupt signal generating means including a two-input logic gate having one input connected directly to the output of the logic gate means and a delay line connected between the logic gate means and the other input of the two-input logic gate, the output of the two-input logic gate being an interrupt signal.

13. The control system for a multi-phase brushless permanent magnet motor as set forth in claim 1 wherein commutation of the phase windings results in spurious interrupt signals from the interrupt signal generating means, the microprocessor control means masking out the spurious interrut signals due to commutation.

14. The control system for a multi-phase brushless permanent magnet motor as set forth in claim 1 further including means for supplying load current information to the microprocessor control means, the predetermined time after receipt of the interrupt signal being variable by the microprocessor control means as a function of load current.

15. The control system for a multi-phase brushless permanent magnet motor as set forth in claim 1 wherein the microprocessor control means includes an internal timer used by the microprocessor to in part determine motor speed, the predetermined time after receipt of the interrupt signal being variable by the microprocessor control means as a function of motor speed.

16. The control system for a multi-phase brushless permanent magnet motor as set forth in claim 1 wherein the microprocessor control means includes a timing algorithm which is responsive to the interrupt signal to determine an optimum switching point fo commutation of the phase which generated the interrupt signal.

17. A control system for a multi-phase brushless permanent magnet motor having a stator with at least one phase winding per phase of the motor, a rotor mounted for rotation in the stator, said rotor carrying a plurality of permanent magnets so that rotation of the rotor with respect to the stator generates a back EMF in the phase windings of the stator, and motor terminals for each phase adapted to be connected to a power source, comprising:

means connected to the motor terminals for sensing the back EMF of each phase and in response thereto periodically generating signals representing the relative position of the rotor with respect to the stator;

means for detecting when the back EMF for each phase referenced to motor neutral crosses zero;

means for decoding the periodically generated signals to determine the presence of the rotor at one of a plurality of predetermined rotary positions with respect to the stator;

said decoding means including means for generating an interrupt signal in response to the presence of the rotor at one of the plurality of predetermined rotary positions with respect to the stator;

electrically controllable switch means connected to the phase windings to control the flow of current therethrough;

microprocessor control means responsive to the interrupt signal for controlling in a closed loop manner the switch means to commutate the phase windings of the motor a predetermined time after receipt of the interrupt signal, said microprocessor control means also being responsive to the speed of the motor to start the motor in an open loop mode and to shift commutation to the closed loop mode once the motor reaches a predetermined speed.

18. The control system for a multi-phase brushless permanent magnet motor as set forth in claim 17 wherein the power source includes an electrically controllable converter for converting alternating current power to a source to direct current power, for application of said direct current power to the switch means and the phase windings, wherein the microprocessor control means is responsive to the motor speed to control the voltage applied by the electrically controllable converter to the phase windings.

19. The control system for a multi-phase brushless permanent magnet motor as set forth in claim 17 wherein the back EMF sensing means includes means for scaling and filtering the back EMF of each phase winding to a level compatible with the components of the zero crossing detecting means.

20. The control system for a multi-phase brushless permanent magnet motor as set forth in claim 17 wherein the zero crossing detecting means includes a comparator for each phase winding, said comparator having one input connected through a scaling circuit to its associated motor terminal so that the voltage on said one input is the back EMF from that motor terminal, said comparator for each phase winding also having its other input connected to a circuit whose output is representative of the neutral voltage of the motor, so that the output of the comparator for each phase represents the back EMF of that phase winding referenced to motor neutral.

21. The control system for a multi-phase brushless permanent magnet motor as set forth in claim 20 wherein the motor includes a neutral conductor terminal, and wherein the zero crossing detecting means includes means for scaling the signal from the neutral conductor terminal by the same amount as the scaling circuit for the other motor terminals scale the back EMFs for those terminals.

22. The control system for a multi-phase brushless permanent magnet motor as set forth in claim 20 wherein the zero crossing detecting means includes means for simulating the motor neutral.

23. The control system for a multi-phase brushless permanent magnet motor as set forth in claim 20 wherein the zero crossing detecting means includes at least one logic gate for each phase winding of the motor, one output of the comparator for that phase winding being directly connected to one input of the logic gate, further including a delay line connected between the output of the comparator and the other input of the logic gate, so that the output of the logic gate generates a signal when the back EMF of its associated phase winding referenced to motor neutral goes through zero.

24. The control system for a multi-phase brushless permanent motor as set forth in claim 23 wherein the interrupt signal generating means includes a logic gate having as inputs the outputs of the logic gates for all the phase windings.

25. The control system for a multi-phase brushless permanent magnet motor as set forth in claim 17 wherein commutation of the phase windings results in spurious interrupt signals from the interrupt signal generating means, the microprocessor control means masking out the spurious interrupt signals due to commutation.

26. The control system for a multi-phase brushless permanent magnet motor as set forth in claim 17 further including means for supplying load current information to the microprocessor control means, the predetermined time after receipt of the interrupt signal being variable by the microprocessor control means as a function of load current.

27. The control system for a multi-phase brushless permanent magnet motor as set forth in claim 17 wherein the microprocessor control means includes an internal timer used by the microprocessor to in part determine motor speed, the predetermined time after receipt of the interrupt signal being variable by the microprocessor control means as a function of motor speed.

28. The control system for a multi-phase brushless permanent magnet motor as set forth in claim 17 wherein the microprocessor control means includes a timing algorithm which is responsive to the interrupt signal to determine an optimum switching point for commutation of the phase which generated the interrupt signal.

29. A method for controlling a multi-phase brushless permanent magnet motor having a stator with at least one phase winding per phase of the motor, a rotor mounted for rotation in the stator, said rotor carrying a plurality of permanent magnets so that rotation of the rotor with respect to the stator generates a back EMF in the phase windings of the stator, zero crossing detecting means for detecting when the back EMF crosses motor netural zero motor terminals for each phase, and electrically controllable switch means connected between a power source and the phase windings to control the flow of current therethrough, comprising the steps of:
sensing the back EMF of each phase and in response thereto periodically generating signals representing the relative position of the rotor with respect to the stator;
decoding the periodically generated signals to determine the presence of the rotor at one of a plurality of predetermined rotary positions with respect to the stator;
generating an interrupt signal in response to the presence of the rotor at one of the plurality of predetermined rotary positions with respect to the stator;
starting the motor in an open loop mode;
once a predetermined motor speed has been reached, shifting from said open loop mode to a closed loop mode of operation; and
controlling the switch means in a closed loop to commutate the phase windings of the motor a predetermined time after receipt of the interrupt signal once the predetermined motor speed has been reached.

30. The method as set forth in claim 29 wherein the power source includes an electrically controllable converter for converting alternating current power to a source to direct current power, for application of said direct current power to the switch means and the phase windings, including the further step of controlling the voltage applied by the electrically controllable converter to the phase windings as a function of motor speed.

31. The method as set forth in claim 29 further including the step of scaling and filtering the back EMF of each phase winding to a level compatible with the components of the zero crossing detecting means.

32. The method as set forth in claim 29 further including the step of simulating the motor neutral.

33. The method as set forth in claim 29 wherein commutation of the phase windings results in spurious interrupt signals from the interrupt signal generating means, further including the step of masking out the spurious interrupt signals due to commutation.

34. The method as set forth in claim 29 further including the step of varying the predetermined time after receipt of the interrupt signal until commutation as a function of load current.

35. The method as set forth in claim 29 including the further step of varying the predetermined time after receipt of the interrupt signal until commutation as a function of motor speed.

36. The method as set forth in claim 29 including the further step of computing by a timing algorithm which is responsive to the interrupt signal an optimum switching point for commutation of the phase which generated the interrupt signal.

37. The method as set forth in claim 29 wherein the phase which generates the interrupt signal is the phase which is next commutated on.

* * * * *

UNITED STATES PATENT AND TRADEMARK OFFICE
CERTIFICATE OF CORRECTION

PATENT NO. : 4,743,815
DATED : May 10, 1988
INVENTOR(S) : Gee et al

It is certified that error appears in the above—identified patent and that said Letters Patent is hereby corrected as shown below:

Column 5, Line 34, "thre" should be "three"

Column 12, Line 14, "fo" should be "for"

Column 13, Line 38, "permanent motor" should be "permanent magnet motor"

Signed and Sealed this

Eighteenth Day of October, 1988

Attest:

DONALD J. QUIGG

*Attesting Officer*    *Commissioner of Patents and Trademarks*